United States Patent

[11] 3,547,381

[72] Inventors Edward E. Shaw;
 Glen R. Strevey, Boulder, Colo.
[21] Appl. No. 694,533
[22] Filed Dec. 29, 1967
[45] Patented Dec. 15, 1970
[73] Assignee Ball Brothers Research Corporation
 Boulder, Colo.
 a corporation of Colorado

[54] THREE-AXIS ORIENTATION SYSTEM
 17 Claims, 15 Drawing Figs.
[52] U.S. Cl. ..................................................... 244/77;
 235/150.25; 244/1; 244/3.2
[51] Int. Cl. ........................................................ G05d 1/12
[50] Field of Search ........................................... 318/20,
 810, 810.5, 810.6; 244/77, 79, 1S.S., 3.13, 3.16,
 3.2, 3.21, 3.22; 235/150.2, 150.25

[56] References Cited
 UNITED STATES PATENTS
2,737,356 3/1956 Varian et al. .................. 244/3,21X

| | | | |
|---|---|---|---|
| 3,028,807 | 10/1962 | Burton et al. ................. | 244/3.13 |
| 3,164,338 | 1/1965 | Cooper et al. ................. | 244/3.21X |
| 3,221,238 | 11/1965 | Unger et al. .................. | 235/150.2X |

Primary Examiner—Milton Buchler
Assistant Examiner—Jeffrey L. Forman
Attorney—Campbell, Harris and O'Rourke ABSTRACT: A system that is automatically operable to orient a vehicle in three axes. The system first starts despinning of the vehicle in the roll axis with respect to a predetermined reference source. At a predetermined time after commencement of despinning, acquisition in the pitch and yaw axes is commenced again with respect to a reference source. After acquisition in the three axes, control is transferred to a tracking mode with line of sight to a preselected target being from the aft end of the vehicle. Each axis of the system comprises a core unit capable of both coarse and fine sensing with processing circuitry for each, including a voltage limiter, a three-level contactor, monostable multivibrators, and derived rate feedback.

Fig. 1

INVENTORS
EDWARD E. SHAW
GLEN R. STREVEY
BY
Campbell, Harris & O'Rourke
ATTORNEYS

INVENTORS
EDWARD E. SHAW
GLEN R. STREVEY
BY Campbell, Harris & O'Rourke
ATTORNEYS

INVENTORS
EDWARD E. SHAW
GLEN R. STREVEY

THREE-AXIS ORIENTATION SYSTEM

BACKGROUND OF THE INVENTION

1. Field of the Invention

This invention relates to control systems for vehicles and relates more particularly to three-axis orientation systems for space vehicles.

2. Discussion of the Prior Art

Over the last several years much attention has been given to automatic control of vehicles, including automatic control of aircraft and, more recently, automatic control of space vehicles. While there was no necessity for stabilizing some early vehicles carrying instruments for experimentation, such as instruments carried on sounding rockets, for example, it became necessary, as the instruments became more sophisticated, to orient and stabilize the vehicle in order to properly conduct these experiments. Thus, as the instruments carried in the vehicle became sophisticated, the vehicle itself became more sophisticated by the provision of increasing complex orientation systems progressing from single-axis orientation to orientation in two axes, and finally orientation in all three axes—roll, pitch, and yaw.

While three-axis orientation systems have been proposed and/or utilized heretofore, none of these systems have proved to be completely successful due, at least in part, to the complicated circuitry involved, inability to meet expanded requirements for use, and/or failure in dependability under all encountered conditions.

In addition, prior orientation systems of this type have generally required the nose cone to be ejected prior to conducting of experiments, since the target to be sensed by a track, or fine, sensor has commonly been located in the nose cone section.

SUMMARY

This invention provides an improved three-axis orientation system for a vehicle which includes an improved core unit for each axis whereby dependable orientation in each axis is quickly achieved with respect to predetermined references.

It is therefore an object of this invention to provide an improved system for three-axis orientation of a vehicle with respect to predetermined references.

It is another object of this invention to provide an improved three-axis orientation system automatically operable to capture and thereafter track a predetermined target.

It is still another object of this invention to provide an improved three-axis orientation system having automatic control circuitry for starting despinning of a vehicle in the roll axis and at a predetermined later time, commencing acquisition in the pitch and yaw axes followed by tracking in all three axes of a predetermined target.

It is another object of this invention to provide a three-axis orientation system having an improved core unit for each axis.

It is still another object of this invention to provide an improved core unit for a three-axis orientation system wherein the core unit includes a voltage limiter, a three-level contactor, monostable multivibrators, and derived rate feedback.

It is another object of this invention to provide an improved three-axis orientation system mounted in a space vehicle in a manner such that orienting drive is from the nose cone section and sensing of an external target is along a line of sight from the aft section of the vehicle.

With these and other objects in view, which will become apparent to one skilled in the art as the description proceeds, this invention resides in the novel construction, combination and arrangement of parts substantially as hereinafter described, and more particularly defined by the appended claims it being understood that such changes in the embodiments of the herein disclosed invention are meant to be included as come within the scope of the claims.

BRIEF DESCRIPTION OF THE DRAWINGS

The accompanying drawings illustrate two embodiments of the invention according to the best mode so far devised for the practical application of the principles thereof, and in which.

DETAILED DESCRIPTION OF THE PREFERRED EMBODIMENTS

Referring now to the drawings, the numeral 20 indicates generally the three-axis orientation system of this invention, which comprises core control units 22, 23, and 24, for the roll, pitch, and yaw axes, respectively.

Figure 1:
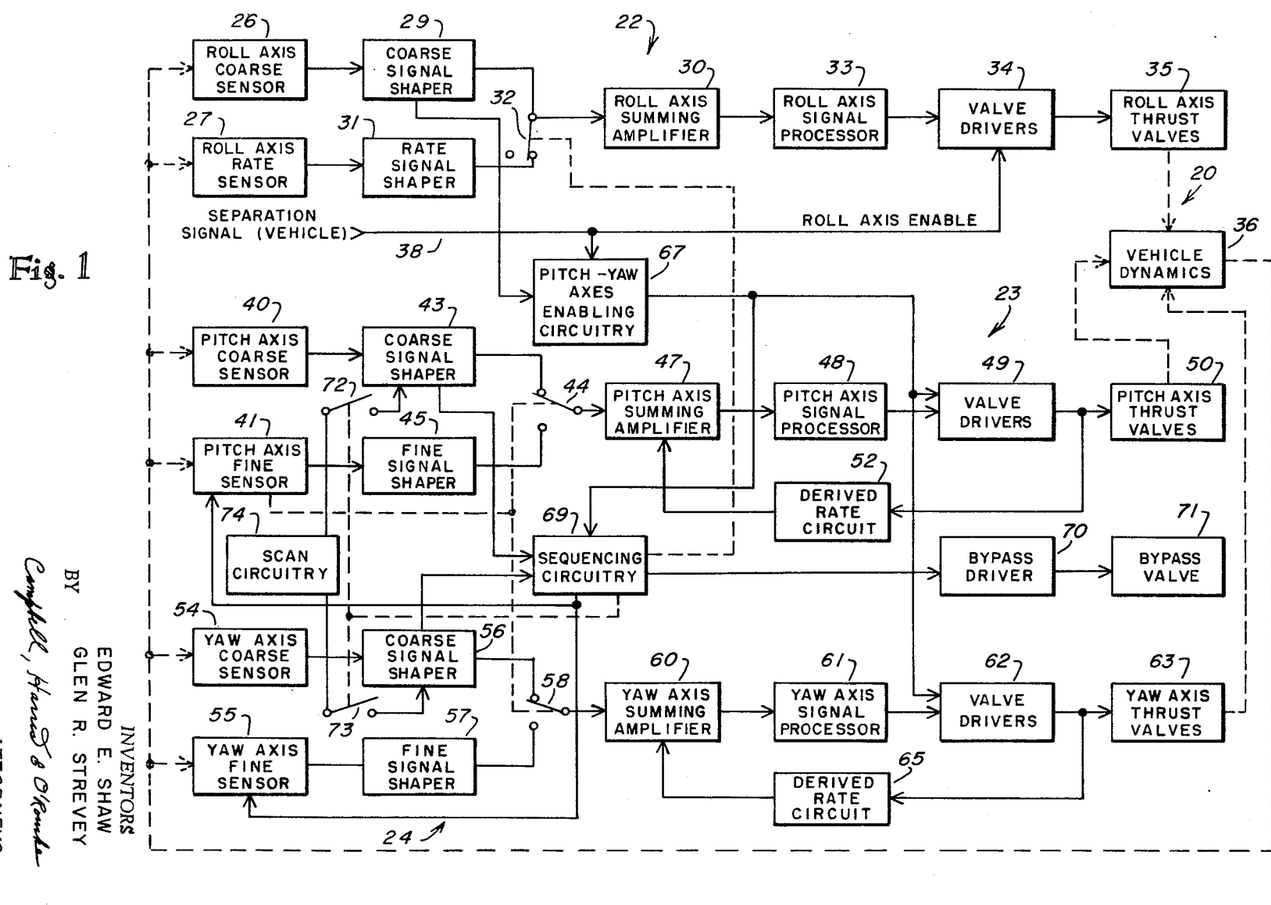
FIG. 1 is a simplified block diagram of the three-axis orientation system of the invention.

As shown in FIG. 1, roll axis core unit 22 includes a coarse sensor 26 and a rate sensor 27. Coarse sensor 26 may be conventional and may be, for example, a gyro package, or attitude reference unit, having reference sensing over 360°. Attitude reference units of this type are offered on the commercial market and one such unit is offered, for example, by ACCO, a division of American Chain and Cable Company Incorporated. Magnetometers could also be used in place of the gyro package, if so desired.

The rate sensor is likewise conventional and could be, for example, a rate gyro or an output from the gyro reference package. It is also possible to utilize a fine sensor in some applications for tracking to achieve better accuracy. This unit could also be conventional, and could be, for example, an additional gyro or a magnetometer.

The output from coarse sensor 26 is coupled through a coarse signal shaper 29 to summing amplifier 30. In like manner, the output from rate sensor 27 is coupled through rate signal shaper 31 and a switch 32 to summing amplifier 30. Switch 32 is closed during despinning and acquisition and normally open thereafter. If a fine sensor (not shown) is utilized in the roll axis core unit, an additional switch (not shown) is utilized to switch either the coarse or fine sensor into the circuit.

The output from summing amplifier 30 is coupled through signal processor 33 to valve drivers 34, which control the operation of the roll axis thrust valves 35. The thrust valves will, of course, change the attitude of the vehicle (indicated by the numeral 36 for the block entitled "Vehicle Dynamics"), and thus change the orientation of the sensors for each axis as also indicated in FIG. 1. An activating signal (which as indicated in FIG. 1 can be a signal conventionally produced at the time of vehicle separation) is coupled to the valve drivers on lead 38 to enable the roll axis error signal coupled to the vehicle drive (thrust valves 35).

In like manner, pitch axis core unit 23 includes a pitch axis coarse sensor 40, which like the roll axis coarse sensor can be a part of the attitude reference gyro unit. The coarse sensor could also be a magnetometer or a solar sensor, for example, both of which are also conventional. Pitch axis fine sensor 41 is likewise provided and can be a star tracker, a solar tracker, or a magnetometer, for example, which units are again conventional. The output from pitch axis coarse sensor 40 is coupled through coarse signal shaper 43 to one contact of switch 44. The other contact of switch 44 is connected through fine signal shaper 45 to pitch axis fine sensor 41.

The movable contactor of switch 44 is connected to pitch axis summing amplifier 47, the output of which is coupled through signal processor 48 to valve drivers 49. Valve drivers 49 control pitch axis thrust valves 50, which like thrust valves 35 cause vehicle deviation, which obviously causes a shift in the orientation of the sensors. The outputs from valve drivers 49 are also coupled through derived rate circuit 52 and fed back to summing amplifier 47, as discussed more fully hereinafter.

Yaw axis core unit 24 likewise includes a coarse sensor 54 and a fine sensor 55 which are connected through coarse signal shaper 56 and fine signal shaper 57, respectively, to opposite contacts of switch 58. The movable contactor of switch 58 is connected through yaw axis summing amplifier 60 and signal processor 61 to valve drivers 62, the output from which controls yaw axis thrust valves 63 to cause deviation of the vehicle to cause a shift in orientation of the sensors. The outputs from valve drivers 62 are coupled to derived rate circuit 65, the output of which is fed back through the yaw axis summing amplifier 60 in the same manner as the derived rate feedback is coupled back to summing amplifier 47.

As shown in FIG. 1, an output from coarse signal shaper 29 is also coupled to pitch-yaw axes enabling circuitry 67 as is the input signal on lead 38. The output from enabling circuitry 67 is coupled to valve drivers 49 and 62 in the pitch and yaw core units 23 and 24, respectively, and to sequencing circuitry 69. Two other inputs are also coupled to sequencing circuitry 69, one being from coarse signal shaper 43 in the pitch axis coarse unit and the other being from coarse signal shaper 56 in the yaw axis core unit.

One output from sequencing circuitry 69 is coupled back to pitch axis fine sensor 41 and yaw axis fine sensor 55 to enable the same, while a second output is coupled to bypass driver 70, which is utilized to drive bypass valve 71 to bypass the regulator in the pneumatic system. In addition, sequencing circuitry 69 is used to control the position of switch 32 in the roll axis core unit and is used to control switches 72 and 73. Switch 72 connects a signal indicating scan input to the coarse signal shaper 43 in the pitch axis core unit, while switch 73 connects the signal indicating scan input to coarse signal shaper 56 in the yaw axis core unit. Switches 72 and 73 are closed when the fine sensors fail to sense the presence of a target to cause scan to coarse target searching. The switches and accompanying scan circuitry 74 could also be utilized if a plurality of targets are to be sequentially acquired and tracked.

As also indicated in FIG. 1, outputs from pitch axis fine sensor 41 are used to control switches 44 and 58 in the pitch axis and yaw axis core units, respectively, to switch the orientation system between the acquisition (coarse sensing) mode and the tracking (fine sensing) mode.

Figure 2:
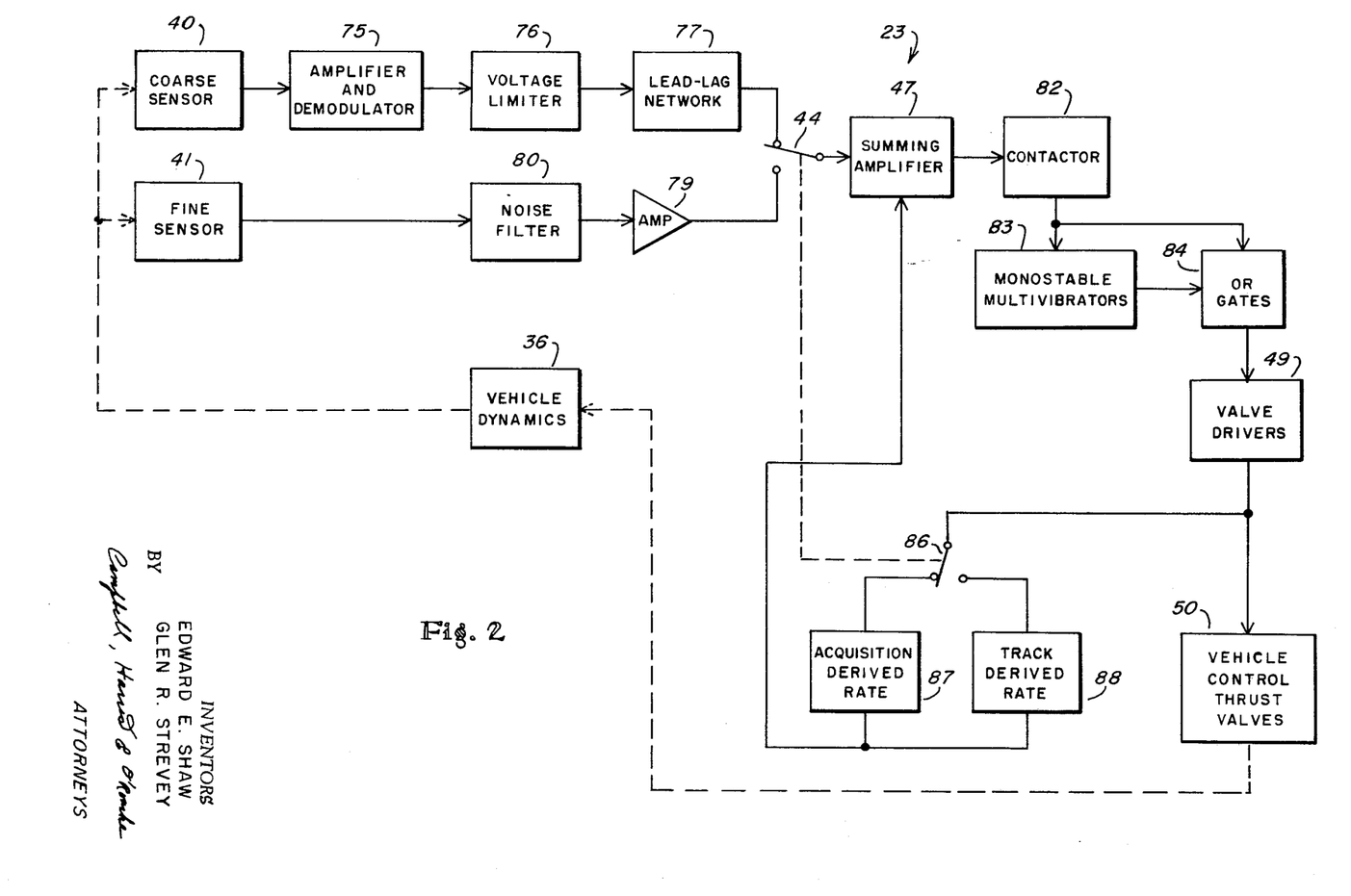
FIG. 2 is a block diagram in more detail of one axis of the orientation system as shown in FIG. 1.
Figure 3:
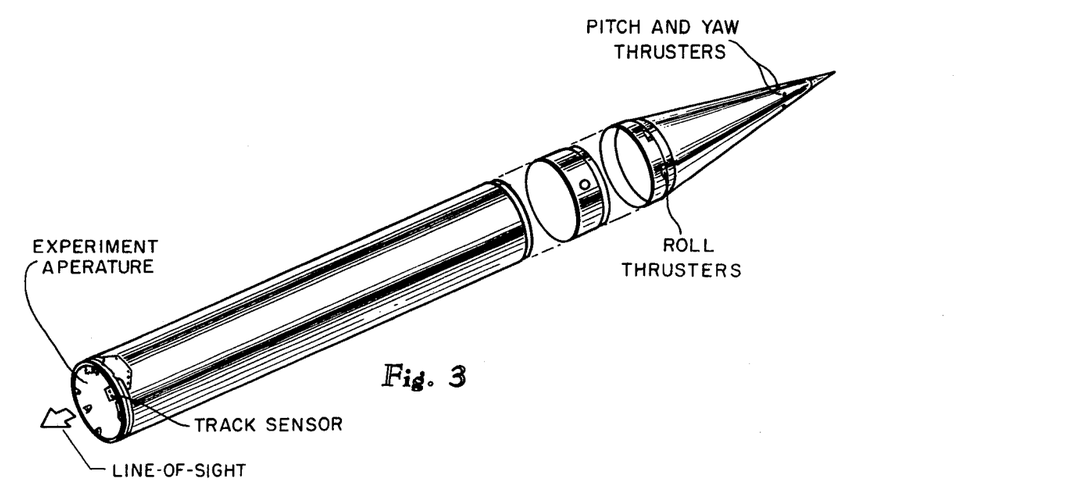
FIG. 3 is a perspective view of a space vehicle having the three-axis orientation system of this invention mounted therein.

Referring now to FIG. 2, a block diagram of pitch axis core unit 23 is shown in more detail, this axis being also illustrative of the yaw axis and basically to the roll axis (without feedback), as can be appreciated from FIG. 1. As can be seen by comparison of the pitch axis core unit as shown in FIG. 2 with the simplified block diagram of the pitch axis core unit as illustrated in FIG. 1, coarse signal shaper 43 includes amplifier and demodulator 75, voltage limiter 76, and lead-lag network 77, while fine signal shaper 45 includes an amplifier 79 and a noise filter 80, all of which may be conventional.

Amplifier and demodulator 75 conditions input signals from the coarse sensor for system compatibility while amplifier 79 conditions input signals from the fine sensor for system compatibility. Such a signal could be, for example, a produced output signal having sufficient magnitude to drive the next state. A demodulator is not necessary in all applications, but would be used, for example, with an attitude reference unit or a magnetometer.

Figure 4:
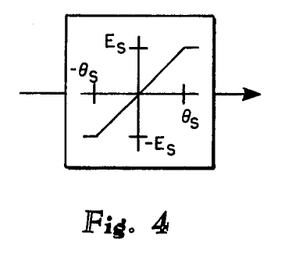
FIG. 4 is a typical plot illustrating operation of the voltage limiter shown in FIG. 2.

Voltage limiter 76 is used conventionally to limit voltage to a predetermined range, which as illustrated in FIG. 4, is generically expressed as a range of between $+E_s$ and $-E_s$ from $+\theta$ to $-\theta_s$.

Lead-lag network 77 serves to ensure system stability and this network follows the general ratio:

$$\frac{aT_A S + 1}{T_A S + 1} \qquad (1)$$

wherein $a$ is a constant lead, $T_A$ is a time constant for the acquisition mode, and S is the LaPlace transform.

Noise filter 80 is not necessary under all conditions but, if utilized follows the general ratio:

$$\frac{1}{T_r S + 1} \qquad (2)$$

wherein $T_9 6$ is the time constant for the filter, and S is the LaPlace transform.

As also shown from comparison of FIGS. 1 and 2, pitch axis signal processor 48 includes contactor 82, monostable multivibrators 83, and OR gates 84.

Contactor 82 is a three-level contactor which gives a positive constant voltage output, a negative constant voltage output, or a zero output, depending upon the magnitude and polarity of the signal input, and could also be considered threshold discriminators, as is conventional.

Monostable, or one-shot, multivibrators 83 are conventional and the length of firing depends upon the time needed for proper operation of vehicle thrust in junction with valve drivers 49, which may be conventional power transistors. It has been found that a 14 millisecond monostable multivibrator is satisfactory for use in the system of this invention.

As shown in FIG. 2, OR gates 84 receive the output from one-shot multivibrators 83 as well as a direct output from the contractor, which signal bypasses multivibrator 83. This assures that there will be an output from the OR gates to the valve drivers should the signal from the contractor be of longer duration than the output from the multivibrator, and yet assures a minimum length signal (from the multivibrator) to cause thrust in the desired direction.

As also shown in FIG. 2, derived rate feedback circuit 52 includes acquisition derived rate 87 and track derived rate 88, depending upon the position of switch 86, which is constrained to movement along with switch 44 as is indicated in FIG. 2. Derived rate feedback is utilized to provide dampening signals for system stability purposes and to suppress noise.

Figure 5:
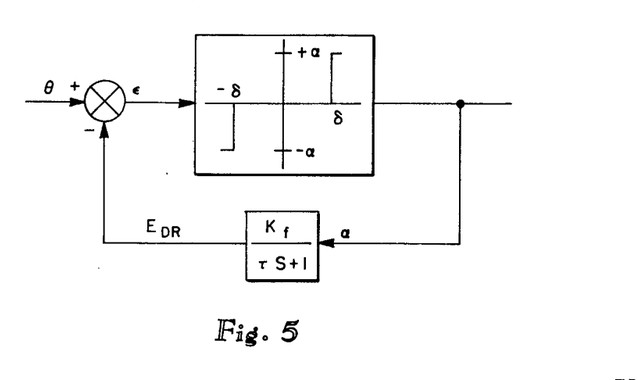
FIG. 5 is a representative block diagram utilized for explanation of derived rate feedback.

Derived rate is a means for generating rate information from signals generated internally of the orientation system and is based on the consideration that if the torque and inertia about an axis is known, the output of the contractor is directly proportional to the acceleration about that axis. Vehicle rate is directly proportional to the time integral of this acceleration signal. In the system of this invention, derived rate is mechanized by coupling the contactor output through a lag network the output of which is proportional to the change in vehicle rate if the acceleration thrust time is small relative to the lag network time constant. Referring to FIG. 5, which shows a derived rate block diagram, $$E_{DR} = K_t a(1 - e^{-t/\tau}) = K_t a \left( \frac{t}{\tau} - \frac{t^2}{2\tau^2} + \frac{t^3}{6\tau^3} - \ldots \right) \text{ FOR } \frac{t}{\tau} \ll 1 \qquad (3)$$

$$E_{DR} = \frac{K_f}{\tau}(at) = K\Delta\dot{\theta}\Delta\dot{\theta} = \dot{\theta} - \dot{\theta}_0 = at \quad K = \frac{K_f}{\tau}$$

wherein $E_{DR}$ is the voltage output of the derived rate network, $K_f$ is the gain of the derived rate network, $a$ is the contactor output voltage, $t$ is the acceleration thrust time, $\tau$ is the time constant of the derived rate lag network, and $\theta$ is the angular change of the system.

As shown from FIG. 5 and the equations with respect thereto, the rate information that is available from a derived rate feedback network is only that rate generated by thruster force.

From the foregoing, it can be seen that the derived rate network for acquisition mode follows the ratio:

$$\frac{K_{fA}}{T_{tA}S+1} \quad (4)$$

wherein $K_{fA}$ is the gain of acquisition feedback, $T_{fA}$ is the time constant for the acquisition decimal rate, and S is the LaPlace transform.

In the like manner, the track derived rate follows the ratio:

$$\frac{K_{ft}}{T_{ft}S+1} \quad (5)$$

wherein $K_{ft}$ is the gain of track feedback, $T_{ft}$ is the time constant for track feedback, and S is the LaPlace transform.

An anomaly of derived rate feedback is a decaying rate signal when the thrusters are inactive and vehicle rate is constant. This effect is present during performance and can be used to advantage, particularly in the track mode, to achieve both noise suppression and stability control.

Figures 6, 7:
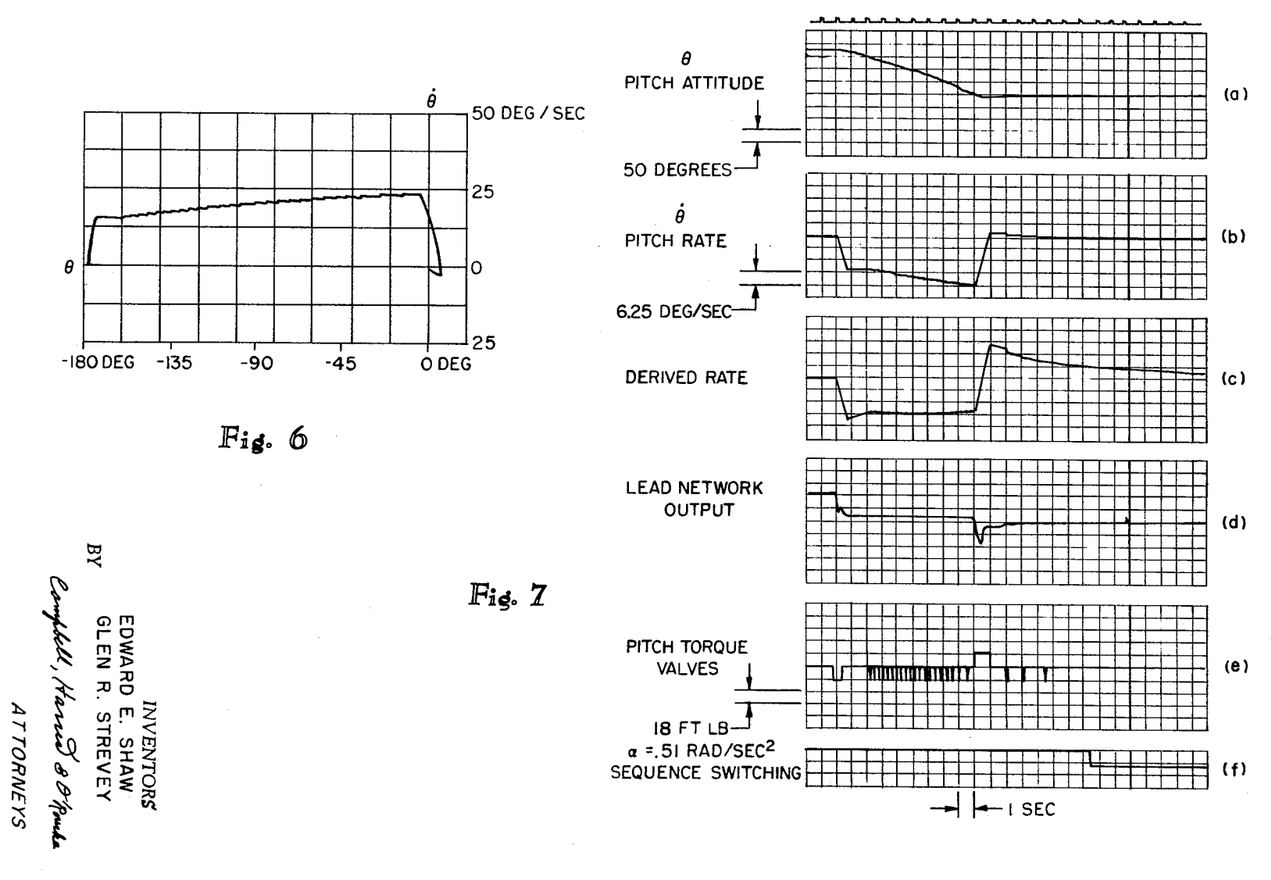
FIG. 6 is a phase-plane plot showing a typical acquisition trajectory of a control system signal.
FIG. 7 is a series of graphs showing the time history of the control system signal of the typical acquisition trajectory as shown in FIG. 6.

FIG. 6 is a phase-plane plot of a typical acquisition trajectory for the system of this invention, while FIG. 7 shows a time history of control signals for the typical trajectory shown in FIG. 6. As utilized therein, vehicle acceleration with thruster valves activated is 0.5 radian/sec$^2$, the derived rate gain is 0.233, the switching point $\delta$ is 0.6° and the limiter saturation level is 4°. These values are typical for the system of this invention for pitch and yaw axis acquisition. As shown in the phase-plane plot of FIG. 5, the trajectory is not a minimum time trajectory, but is slightly slower to enable use of a system which is highly adaptable for different performance requirements and error sensors.

The phase-plane (shown in FIG. 6) exhibits a form of common velocity ledge during the early portion and the reticence stepping action (about null) that is characteristic of highly damped systems using a three-level contactor with hysteresis. Examination of the time plot (shown in FIG. 7) shows the output at the derived rate network increasing during the initial thrust phase until it is large enough to overcome the limiter output voltage and deactivate the thruster valves. At this time, if a rate sensor were used, the vehicle velocity would remain constant until the vehicle position becomes smaller than the limiter saturation level. However, because of the decaying output voltage of the derived rate network when a thruster is off, the thruster pulses during the time the limiter is in a saturated condition. When the vehicle position is less than the limiter saturation level, the opposing thruster is immediately activated to reduce the vehicle velocity. At the completion of this thrust phase, both the position error and vehicle velocity are small and the vehicle follows the reticence trajectory toward null where a limit cycle is established.

Figures 8, 9:
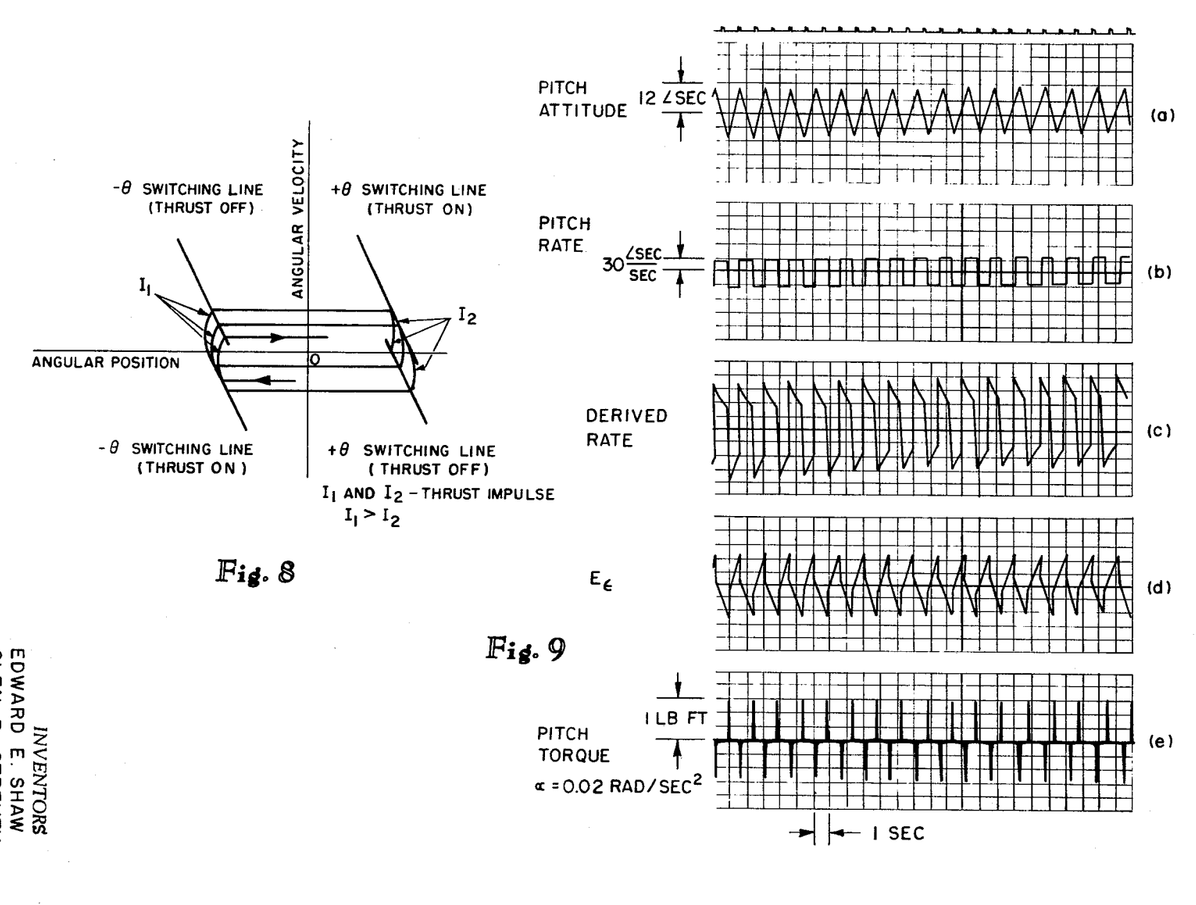
FIG. 8 is a phase-plane plot typical of the control system signal during target tracking.
FIG. 9 is a series of graphs showing the time history of the control system signal shown in the phase-plane plot of FIG. 8.

FIG. 8 is a phase-plane plot of a typical orientation system signal during target tracking, while FIG. 9 shows a series of graphs illustrating the time history of this signal during target tracking. As utilized, the vehicle acceleration is 0.02 radian/sec$^2$, the derived rate gain is 0.0233, the switch point is set at 15 arc seconds, and the minimum thrust impulse causes a change of rate of 58 arc seconds per second.

The phase-plane plot shown in FIG. 8 has what might be termed "a limit cycle within a limit cycle" caused by a difference in the positive and negative impulses, as a result of different monostable times or different positive and negative thruster characteristics.

An examination of FIG. 8 shows that the two contributions of derived rate during limit cycle operation are:

1. During the thrust phase the equivalent hysteresis provided by the monostable-derived rate combination suppresses system and sensor noise (this is evident by examination of the waveforms of FIG. 9 which show that the $E_E$ voltage is rapidly changed during the thrust phase); and 2. proper scaling of the decaying derived rate voltage (when the thruster is off) provides the necessary rate signal required for vehicle damping and limits cycle stability. Freedom of choosing both the derived rate time constant and gain is used at this time to satisfy the noise and rate requirements. The use of derived rate in the track mode eliminates the need for lead compensation and the inherent noise gain associated with this type of compensation, thereby relaxing the noise requirements for the fine sensor. In addition, fuel consumption is minimized utilizing the system of this invention.

Figure 10:
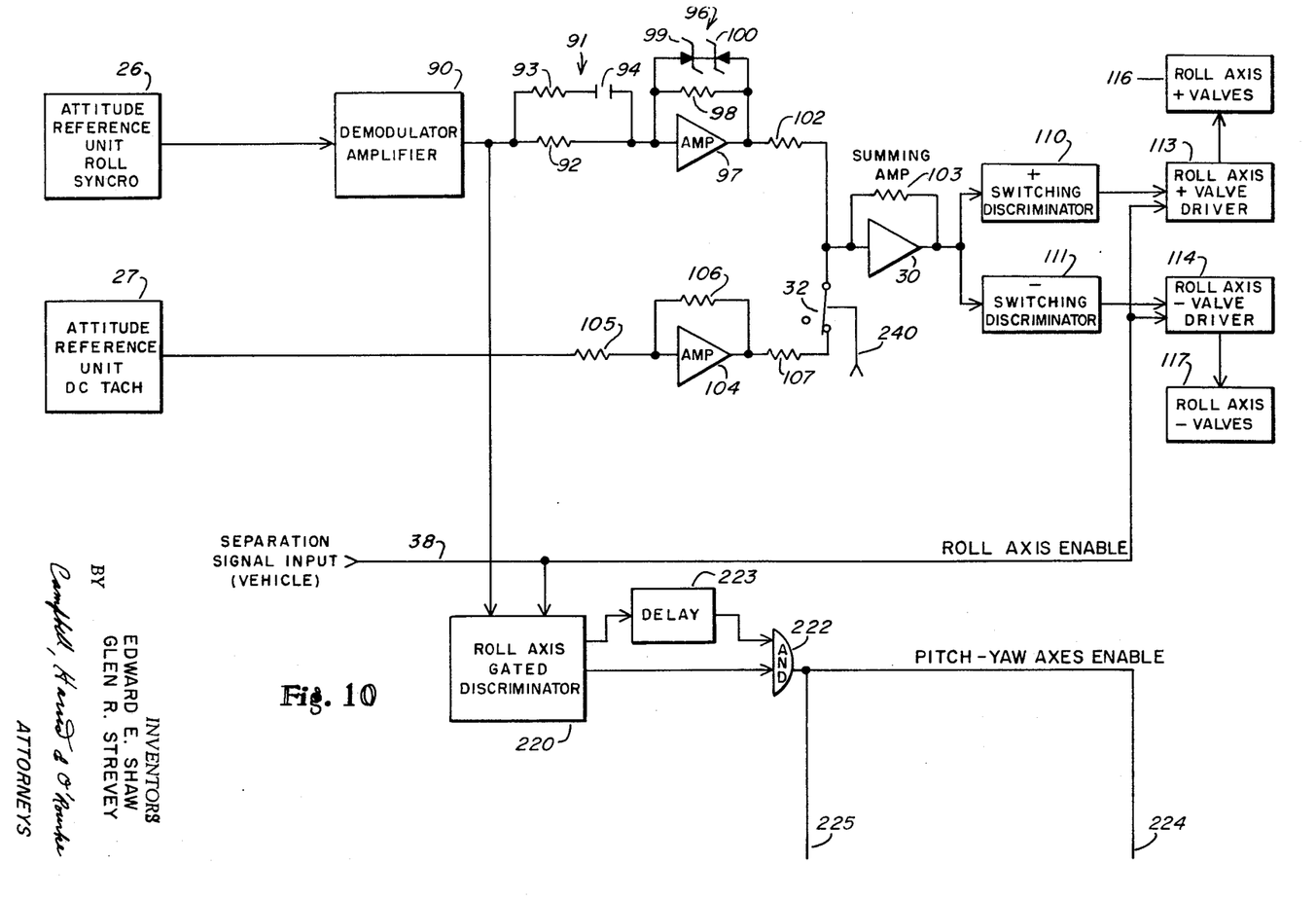
FIGS. 10, 11, and 12, are partial block and schematic diagrams showing in detail the three-axis orientation system illustrated in FIG. 1.
Figure 11:
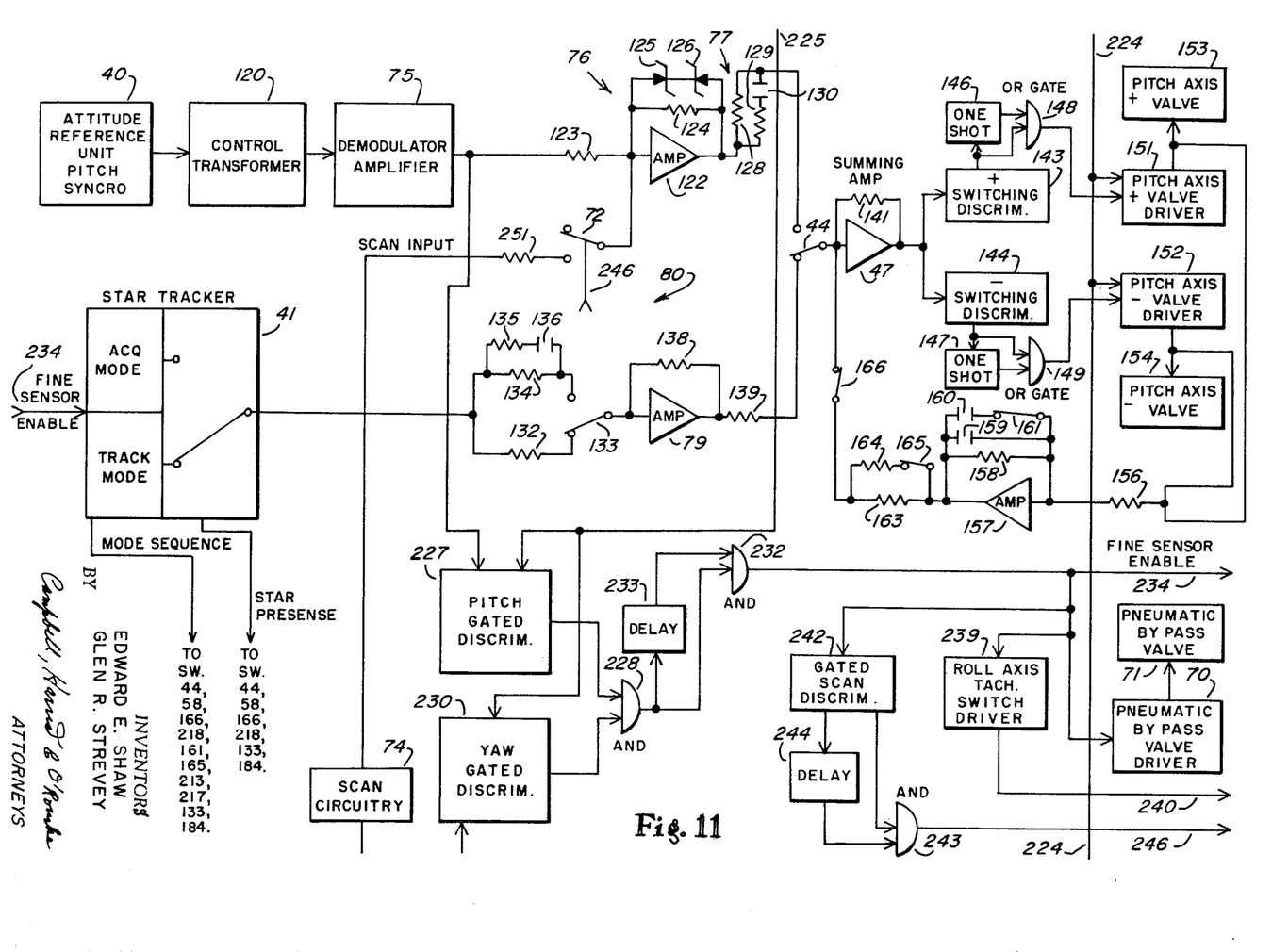
Figures 12, 13:
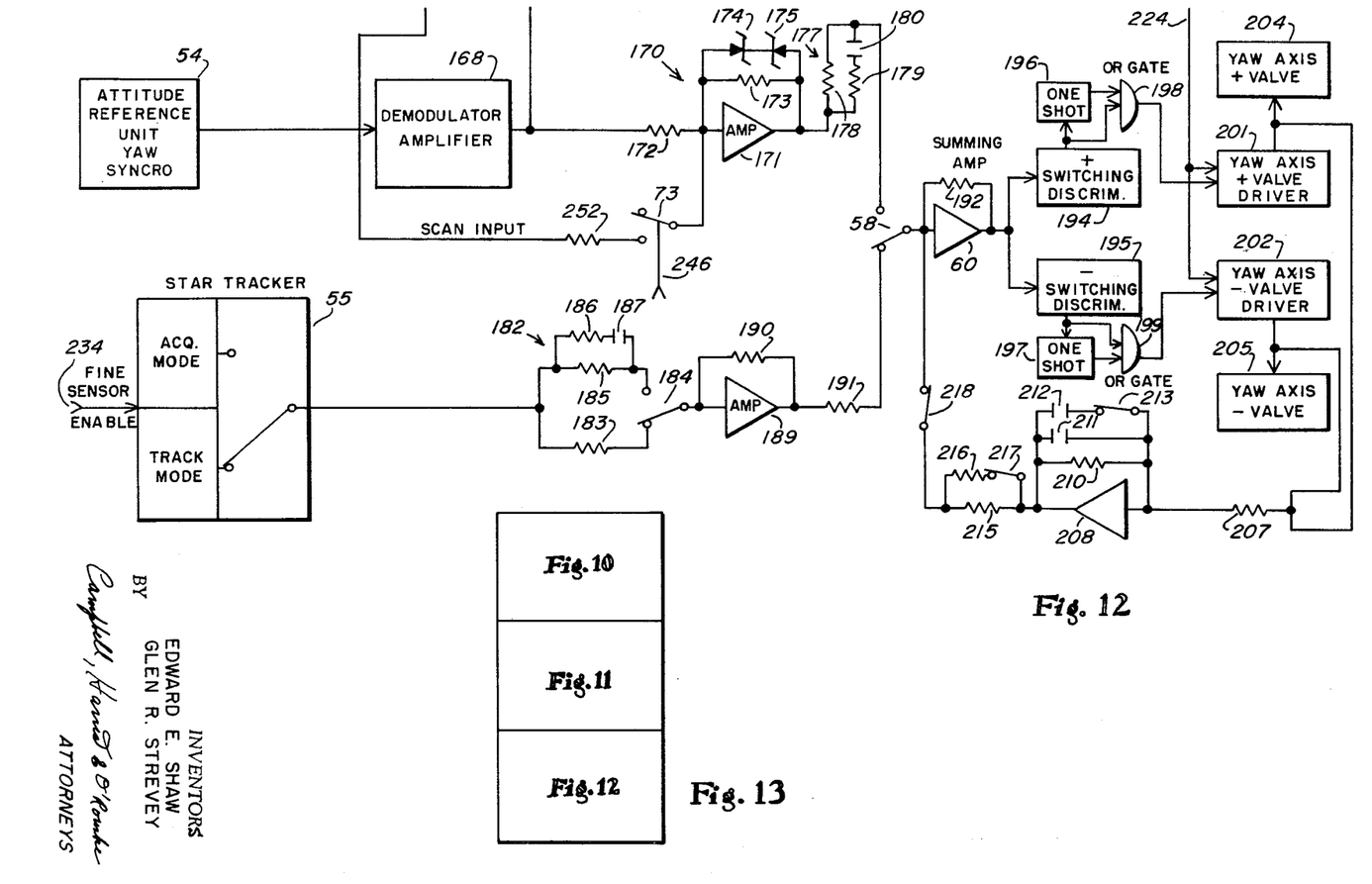
FIG. 13 shows the arrangement of FIGS. 10, 11, and 12, to form a composite block diagram of the three-axis orientation system of this invention.

Referring now to FIGS. 10, 11 and 12, which together (as shown by FIG. 13) form a composite partial block and schematic diagram of the three-axis control orientation system of this invention as shown in FIG. 1. As shown in FIG. 10, roll axis coarse sensor 26 is indicated as being an attitude reference unit, the roll synchro output of which is coupled to demodulator and amplifier 90 (which together with lead-lag network 91 and voltage limiter 96 form coarse signal shaper 29).

The output from demodulator and amplifier 90 is coupled to lead-lag network 91, which network has a resistor 92 connected in parallel with serially connected resistor 93 and capacitor 94. The output from lead-lag network 91 is then coupled to voltage limiter 96, which limiter includes an amplifier 97 having a resistor 98 and back-to-back zener diodes 99 and 100 connected thereacross.

The output from voltage limiter 96 is coupled through resistor 102 directly to roll axis summing amplifier 30, which summing amplifier has a resistor 103 connected thereacross.

Rate sensor 27 is indicated in FIG. 10 as being an attitude reference unit—the DC Tach output from which is coupled to amplifier 104 (of fine signal shaper 31) through a resistor 105 with the amplifier having a resistor 106 thereacross. The output of amplifier 104 is coupled through resistor 107 to switch 32 which is connected at the other side to summing amplifier 30.

As also shown in FIG. 10, the contactor (roll axis signal processor 33) in effect is a positive switching discriminator 110 and a negative switching discriminator 111, which are connected to receive the output from summing amplifier 30. The output from the positive switching discriminator is coupled to valve driver 113 and the negative switching discriminator is coupled to valve driver 114, which taken together form the valve drivers 34 as indicated in FIG. 1.

The output from positive roll axis valve driver 113 is coupled to positive roll axis valve 116, while the output from negative roll axis valve driver 114 is coupled to the negative roll axis valve 117, which, of course, effect vehicle dynamics as indicated in FIG. 1. Both the positive and negative roll axis valve drivers 113 and 114 are activated by a roll axis enable signal on lead 38.

Referring now to FIG. 11, coarse sensor 40 is shown to be an attitude reference unit with the pitch synchro output being coupled through a control transformer 120 to demodulator and amplifier 75. Control transformer 120 is utilized for preprogramming the line of sight to the vicinity of a desired target. Although not shown, the roll is also preprogrammed to assure acquisition of the predetermined target.

The output from the amplifier and demodulator 75 is then coupled to voltage limiter 76, as shown in FIG. 11, includes an amplifier 122 having an input resistor 123 and resistor 124 and back-to-back zener diodes 125 and 126 connected in parallel therewith. The output from voltage limiter 76 is then coupled to lead-lag network 77 which includes a resistor 128 having connected in parallel therewith serially connected resistor 129 and capacitor 130. The output from the lead-lag network 77 is then coupled to switch 44.

As also indicated in FIG. 11, fine sensor 41 may be a star tracker having acquisition and track modes as is conventional. The output from the star tracker (either mode as shown) is coupled to network 80, which includes resistor 132 connected to one contact of switch 133 and resistor 134 having serially connected resistor 135 and capacitor 136 in parallel therewith connected to the other contact. The movable contactor of switch 133 is positioned depending upon the acquisition of the track mode of the star tracker.

The output from network 80 is taken from the movable contactor of switch 133 and coupled to amplifier 79, which has a resistor 138 connected thereacross and a resistor 139 at the output side through which the amplifier is connected to one contact of switch 44.

The movable contactor of switch 44 is connected to summing amplifier 47 which has a resistor 141 connected thereacross. The output from summing amplifier 47 is then coupled to contactor 82 which, as shown in FIG. 11, in effect is a positive switching discriminator 143 and a negative switching discriminator 144. The output from positive switching discriminator 143 is then coupled to one-shot multivibrator 146 while the output from the negative switching discriminator 144 is coupled to one-shot multivibrator 147 (the one-shot multivibrators 146 and 147 taken together being the monostable multivibrators 83 indicated in FIG. 2). The output from one-shot multivibrator 146 is one input to OR gate 148, while the output from one-shot multivibrator 147 is coupled to one input of OR gate (OR gates 148 and 149 being the OR gates 84 indicated in FIG. 2). The second input to the OR gates is coupled directly thereto from the positive and negative switching discriminators 143 and 144.

The output from OR gate 148 is coupled to positive pitch axis valve driver 151, while the output from OR gate 149 is coupled to negative pitch axis valve driver 152 (which drivers together are the drivers 49 shown in FIG. 2). The output from pitch axis valve driver 151 is coupled to positive pitch valve 153, while the output from negative pitch axis valve driver 152 is coupled to negative pitch valve 154 (which are indicated as the vehicle control thrust valves 50 of FIG. 2).

The output from pitch axis valve drivers 151 and 152 are coupled in common through resistor 156 to amplifier 157 in the derived rate feedback path. Amplifier 157 has connected, in parallel therewith, a resistor 158, a capacitor 159, and a capacitor 160, with capacitor 160 being connected into the circuit through a switch 161. Switch 161 is one-half of switch 86 of FIG. 2 and is closed when the fine sensor is operable. The output from amplifier 157 is then coupled through resistor 163, having connected in parallel therewith a resistor 164 which is connected into the circuit by a switch 165 (switch 165 being the other half of switch 86 indicated in FIG. 2). The derived rate is then coupled back to the input side of the summing amplifier through switch 166.

Referring now to FIG. 12, which shows the yaw axis core unit 24, coarse sensor 54 is indicated as being an attitude reference unit with the yaw synchro output being coupled to demodulator and amplifier 168 (demodulator and amplifier 168 along with voltage limiter 170 and lead-lag network 177 form coarse signal shaper 56). The output from demodulator and amplifier 168 is coupled to voltage limiter 170 which includes an amplifier 171 having an input resistor 172 and resistor 173 and back-to-back zener diodes 174 and 175 connected in parallel therewith. The output from voltage limiter 170 is then coupled to lead-lag network 177, which includes a resistor 178 having connected in parallel therewith serially connected resistor 179 and capacitor 180. The output from lead-lag network 177 is then coupled to one contact of switch 58.

Yaw axis fine sensor 55 may, as indicated in FIG. 12, be a star tracker having acquisition and track modes as does the pitch fine sensor. The output from fine sensor 55 is coupled to network 182, which together with amplifier 189 forms fine signal shaper 57. Network 182 includes a resistor 183 connected to one contact of switch 184, while the other contact of the switch is connected to resistor 185 having connected in parallel therewith serially connected resistor 186 and capacitor 187. Switch 184 is positioned according to whether the acquisition or track mode of the star tracker is utilized.

The output from the noise filter 182 is coupled to amplifier 189. Amplifier 189 has a resistor 190 connected thereacross and a resistor 191 at the output connecting the amplifier to the other contact of switch 58.

The output of switch 58 is connected to yaw axis summing amplifier 60, which has a resistor 192 connected thereacross. The output from summing amplifier 60 is then coupled to the contactor, which, as indicated in FIG. 12, is in effect a positive switching discriminator 194, and negative switching discriminator 195, the outputs of which, in turn, are connected to one-shot multivibrators 196 and 197, respectively. The output from one-shot multivibrator 196 is connected to one input of OR gate 198, while the output from one-shot multivibrator 197 is connected to one input of OR gate 199. In addition, OR gates 198 and 199 receive a direct input from switching amplifier discriminators 194 and 195, respectively, as brought out hereinabove with respect to the pitch axis core unit. The contactor, one-shot multivibrators and OR gates together form the yaw axis signal processor of FIG. 1.

The output from OR gate 198 is coupled to positive yaw axis valve driver 201, while the output from OR gate 199 is coupled to negative yaw axis valve driver 202 (which valve drivers together are valve drivers 62 of FIG. 1). The output from positive yaw axis driver 201 is coupled to positive yaw valve 204, while negative yaw axis valve driver 202 is coupled to negative yaw valve 205 (which valves together are the thrust valves of FIG. 1).

The outputs from positive yaw axis valve driver 201 and negative yaw axis valve driver 202 are connected in common through resistor 207 to amplifier 208 in the yaw axis derived rate feedback path. Amplifier 208 has connected in parallel therewith a resistor 210, a capacitor 211, and a capacitor 212, with capacitor 212 being connected into the circuit by means of switch 213. Switch 213 is closed when the star tracker is in the track mode.

The output from amplifier 208 is then coupled to resistor 215, having connected in parallel therewith a resistor 216 which is connected into the circuit by means of switch 217 (which is operated in conjunction with switch 213 for track and to be closed when derived rate is in the track mode). The output from resistor 215 is then coupled to the input side of summing amplifier 60 through switch 218. Switches 166 and 218 are connected operatively with switches 133 and 184, respectively.

The separation signal input on lead 38, as shown in FIG. 10, is coupled to roll axis gated discriminator 220, which discriminator receives a second input from demodulator and amplifier 90. The output from gated discriminator 220 is directly coupled to AND gate 222, the second input of which is coupled from the gated discriminator through delay circuit 223. The output from AND gate 222 is then coupled through lead 224 to pitch axis valve drivers 151 and 152 and yaw axis valve drivers 201 and 202.

The output from AND gate 222 is also coupled through lead 225 to pitch gated discriminator 227, which discriminator receives a second input from demodulator and amplifier 75, as shown in FIG. 11. The output from pitch gated discriminator 227 is coupled to AND gate 228, which receives a second input from yaw gated discriminator 230. Yaw gated discriminator 230 receives in input from AND gate 222 through lead 225 and receives a second input from demodulator and amplifier 168. The output from AND gate 228 is directly coupled to AND gate 232, the second input of AND gate 232 being provided from AND gate 228 through delay circuit 233.

The output from AND gate 232 is coupled to the pitch axis fine sensor and yaw axis fine sensor as an enabling signal through lead 234. Another output from gate 232 is coupled to pneumatic bypass valve driver 70, which is connected to pneumatic bypass valve 71, as shown in FIG. 11. Still another output from AND gate 232 is coupled to roll axis tach switch driver 239, the output of which is coupled through lead 240 to control the positioning of switch 32, as indicated in FIG. 10. A final output from AND gate 232 is coupled to gated scan discriminator 242, the output of which is coupled to AND gate 243 which receives a second input from gated scan discriminator 242 through delay circuit 244. The output from AND gate 243 is coupled through lead 246 to control the positioning of switches 72 and 73. Switch 72 connects the scan input from scan circuitry 74 through resistor 251 to voltage limiter 76, while switch 73 connects the scan input through resistor 252 to voltage limiter 170.

An output from star tracker 41 indicating star presence is also coupled to switches 44, 58, 133, 166, 184, and 218, to control the positioning of the same, while an output indicating mode sequence is coupled to the same switches to reset the same as well as to switches 161, 165, 213, and 127, to control the positioning of these switches.

Although not shown, an input signal could also be coupled to the summing amplifier to provide automatic scan or simple offset during target tracking.

Figure 14:
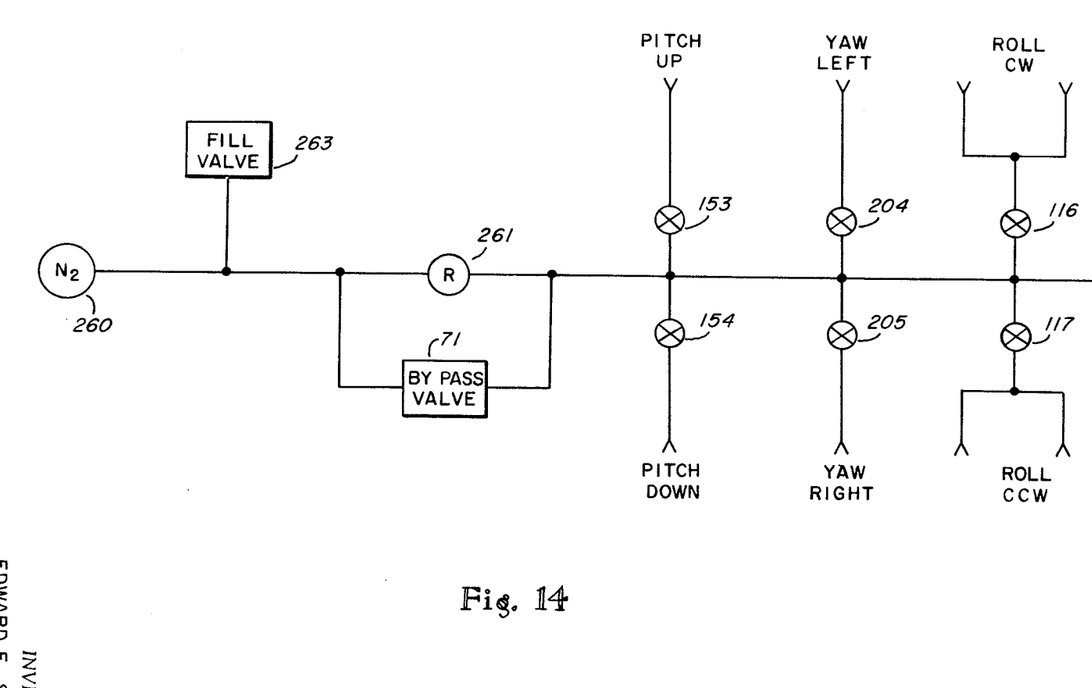
FIG. 14 is a block diagram showing the pneumatics of the three-axis orientation system.

Referring now to FIG. 14, which shows the pneumatics of the system, a source of drive, or thrust, 260, such as nitrogen, for example, is coupled through a regulator 261 to the various valves indicated in FIGS. 10, 11 and 12. Regulator 261 allows a predetermined flow yieldably low thrust during track, for example, of 0.2 lbs. During acquisition, the regulator is bypassed by bypass valve 71 to enable a relatively large thrust during this period, for example, of 4 lbs. A fill valve 263 is also preferably provided, as shown in FIG. 14.

In operation, the roll enabling signal occuring at separation causes commencement of despinning of the vehicle about the roll axis. A timewise later output from the pitch-yaw enabling circuitry then causes commencement of acquisition in the pitch and yaw axes. Fine sensing is commenced by the sequencing circuitry after the target is acquired and tracking of the acquired target is thereafter maintained. The error signals produced by such core unit cause the thrust valves to open to deviate the vehicle in the direction required to reduce and eliminate the error signal along the particular axis.

Figure 15:
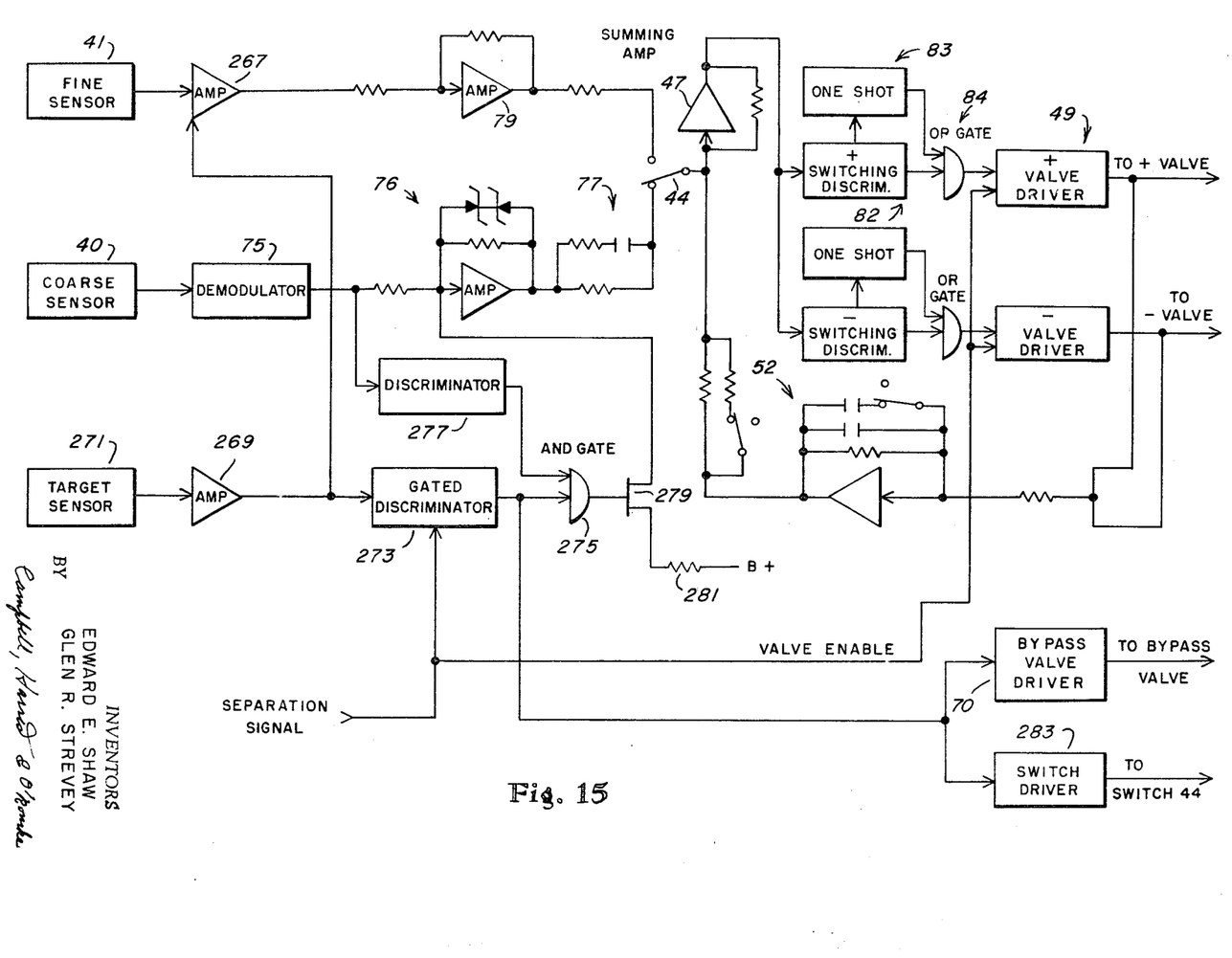
FIG. 15 is a block diagram of a single axis of the orientation system of FIG. 2 to illustrate a modification thereof.

Referring now to FIG. 15 which shows a modified embodiment of the pitch axis core unit of FIGS. 2 and 11, the modifications include fine sensor 41 being coupled to AGC amplifier 267, which receives a control input from amplifier 269 and provides an output to amplifier 79. In addition, a target sensor 271 is provided, the output of which is coupled through amplifier 269 to gated discriminator 273, the second input to discriminator 273 being supplied by the separation input signal.

The output from gating discriminator 273 is coupled to AND gate 275, which gate receives a second input from discriminator 277 which is connected to receive the output signal from amplifier and demodulator 75. The output from the AND gate 275 is coupled to the base of field-effect transistor 279, which is connected to a B+ voltage source at one side through resistor 281 and connected at the other side to the input of voltage limiter 76. The output from gated discriminator 273 is also coupled to bypass valve driver 70 and to switch driver 283 leading to bypass valve 71 and roll axis switch 32, respectively.

Target sensor 271 is thus utilized for automatic gain control for the fine sensor and the field effect transistor 279 provides an effective error signal output to continue movement of the vehicle until such time as the coarse sensors pick up a signal.

From the foregoing, it can be seen that this invention provides an improved orientation system and more particularly an improved three-axis orientation system.

We claim:

1. A three-axis orientation system for a vehicle, said system comprising: first axis sensing and processing circuitry for developing an error signal indicative of deviation from a predetermined reference with respect to said first axis; second axis sensing and processing circuitry for developing an error signal indicative of deviation from a predetermined reference with respect to said second axis, said second axis sensing and processing circuitry including derived rate feedback means; third axis sensing and processing circuitry for developing an error signal indicative of deviation from a predetermined reference with respect to said third axis, said third axis sensing and processing circuitry including derived rate feedback means; drive means; and control means for automatically sequencing said sensing and processing circuitry to quickly and efficiently stabilize said vehicle in conjunction with said derived rate feedback means.

2. The system of claim 1 wherein said vehicle is a space vehicle and wherein said stabilized axes are roll, pitch and yaw axes with said derived rate feedback means being connected in said pitch and yaw axes.

3. The system of claim 1 wherein each said sensing and processing circuitry includes a voltage limiter and a contactor.

4. The system of claim 2 wherein said pitch and yaw axes sensing and processing means includes a voltage limiter, a contactor, and a pair of monostable multivibrators.

5. A core unit for an attitude orientation system, said core unit comprising: sensing means for producing an error signal when said sensor deviates from a predetermined reference; contactor means for producing a positive output signal when an error signal greater than a preselected magnitude is received of one predetermined polarity, for producing a negative output signal when an error signal greater than a preselected magnitude is received of the opposite polarity from said one predetermined polarity, and for producing no output signal when no error signal is received that has a magnitude greater than said preselected magnitude; monostable multivibrator means for receiving the output from said contactor and producing an output signal in response to receipt of an error signal therefrom; and drive means for receiving the output from said multivibrator means and causing movement in response thereto in a direction to reduce and eliminate said error signal.

6. The core unit of claim 5 wherein said multivibrator means includes a pair of one-shot multivibrators one of which is triggered by a positive error signal from said contactor and the other of which is triggered by a negative error signal from said contactor.

7. The core unit of claim 5 wherein said sensing means includes a voltage limiter the output of which is connected with said contactor means.

8. The core unit of claim 5 further characterized by target sensing means and target signal processing means connected with said target sensing means to produce an error signal in the absence of a received signal by sensing means to cause deviation of said vehicle to facilitate target acquisition.

9. The core unit of claim 8 wherein said target signal processing means includes a discriminator connected with said sensing means and a field effect transistor, said transistor being triggered by said discriminator when no target is sensed by said sensing means.

10. The core unit of claim 8 further characterized by an AGC amplifier connected with said sensing means and said target signal processing means for automatic gain control of said core unit.

11. A core unit for an attitude orientation system, said core unit comprising: sensing means for producing an error signal when said sensor deviates from a predetermined reference; summing means; contactor means for producing a positive output signal when an error signal greater than a preselected magnitude is received of one predetermined polarity, for producing a negative output signal when an error signal greater than a preselected magnitude is received of the opposite polarity to said one predetermined polarity, and for producing no output signal when no error signal is received that has a magnitude greater than said preselected magnitude; monostable multivibrator means for receiving the output from said contactor and producing an output signal in response to receipt of an error therefrom; drive means for receiving the output from said multivibrator means and causing movement in response thereto in a direction to reduce said error signal; and derived rate feedback means connected between said multivibrator means and said summing means to provide damping feedback signals to enhance system stability and reduce noise.

12. A core unit for an attitude orientation system, said core unit comprising: coarse sensing means for producing an output signal when said sensor deviates from a predetermined coarse reference; fine sensing means for producing an output signal when said sensor deviates from a predetermined fine reference; switch means for switching between said sensing means; contactor means connected with said switching means for producing a positive output signal when an error signal is received of one predetermined polarity and greater than a preselected magnitude, for producing a negative output signal when an error signal is received of the opposite polarity of said one predetermined polarity and greater than a preselected magnitude, and for producing no output signal when no error signal is received that has a magnitude greater than said preselected magnitude; monostable multivibrator means for receiving the output from said contactor and producing an output signal in response to receipt of an error signal therefrom; and control means connected with said switching means for connecting said fine sensing means into said core unit after an output from said coarse sensing means has produced an output signal.

13. The core unit of claim 12 wherein said coarse sensing means includes a voltage limiter the output of which is connected with said switching means, and further characterized by summing means connected between said switching means and said contactor and derived rate feedback means connected between said multivibrator means output and said summing means.

14. A three-axis orientation system for a space vehicle, said system comprising: first sensor means for producing an output signal when a deviation occurs with respect to a predetermined acquisition reference in the roll axis of said space vehicle; second sensor means for producing an output signal when a deviation occurs with respect to a predetermined rate reference in the roll axis of said space vehicle; first switching means; first signal processing means connected with said first switching means to receive the output signal from one of said first and second sensing means and producing a positive error signal if deviation occurs in one direction and a negative error signal if deviation occurs in the opposite direction; a first pair of valve drivers connected with said first signal processing means, one of said drivers receiving said positive error signal and the other of said drivers receiving said negative error signal; a first pair of thrust valves connected with said first pair of valve drivers to cause vehicle deviation along said roll axis in a manner opposing said deviation causing said error signal to be produced, third sensing means for producing an output signal when a deviation occurs with respect to a predetermined acquisition reference in the pitch axis of said space vehicle; fourth sensing means for producing an output signal when a deviation occurs with respect to a predetermined track reference in the pitch axis of said space vehicle; second switching means; second signal producing means connected with said second switching means to receive the output signal from one of said third and fourth sensing means and producing a positive error signal if deviation occurs in one direction and a negative error signal if deviation occurs in the opposite direction; a second pair of valve drivers connected with said second signal processing means, one of said valve drivers receiving said positive error signal and the other of said valve drivers receiving said negative error signal; a second pair of thrust valves connected with said second pair of valve drivers to cause vehicle deviation along said pitch axis in a manner opposing said deviation causing said error signal to be produced; fifth sensing means for producing an output signal when a deviation occurs with respect to a predetermined acquisition reference in the yaw axis of said space vehicle; sixth sensing means for producing an output signal when a deviation occurs with respect to a predetermined track reference in the yaw axis of said space vehicle; third switching means; third signal processing means connected with said third switching means to receive the output signal from one of said fifth and sixth sensing means and producing a positive error signal if deviation occurs in one direction and a negative error signal if deviation occurs in the opposite direction; a third pair of valve drivers connected with said third signal processing means, one of said drivers receiving said positive error signal and the other of said drivers receiving said negative error signal; a third pair of thrust valves connected with said third pair of valve drivers to cause vehicle deviation along said yaw axis in a manner opposing said deviation causing said error signal to be produced; and control means connected with said switching means for causing automatic and sequential acquisition and tracking with respect to all three axes of said space vehicle.

15. The orientation system of claim 14 wherein said first, third and fifth sensing means includes a voltage limiter and a lead-lag network.

16. The orientation system of claim 14 wherein said signal processing means includes a summing amplifier, a contactor, a pair of monostable multivibrators and a derived rate feedback connected between the output of said monostable multivibrators and said summing amplifier.

17. The orientation system of claim 16 wherein said signal processing means includes a pair of OR gates each of which receives the output from one of said monostable multivibrators and a direct output from said contactor.